US012610419B2

(12) United States Patent
Gizis et al.

(10) Patent No.: US 12,610,419 B2
(45) Date of Patent: Apr. 21, 2026

(54) PROVIDING OPTIMUM MOBILE DEVICE DATA NETWORK USAGE

(71) Applicant: Connectify, Inc., Philadelphia, PA (US)

(72) Inventors: Alexander Gizis, Philadelphia, PA (US); Brian Prodoehl, Plymouth Meeting, PA (US); Kevin Cunningham, Swarthmore, PA (US)

(73) Assignee: Connectify, Inc., Philadelphia, PA (US)

( * ) Notice: Subject to any disclaimer, the term of this patent is extended or adjusted under 35 U.S.C. 154(b) by 655 days.

(21) Appl. No.: 17/833,953

(22) Filed: Jun. 7, 2022

(65) Prior Publication Data

US 2022/0394801 A1     Dec. 8, 2022

Related U.S. Application Data

(60) Provisional application No. 63/197,295, filed on Jun. 4, 2021.

(51) Int. Cl.
| | |
|---|---|
| *H04W 76/19* | (2018.01) |
| *H04W 24/08* | (2009.01) |
| *H04W 36/14* | (2009.01) |
| *H04W 84/12* | (2009.01) |

(52) U.S. Cl.
CPC .......... *H04W 76/19* (2018.02); *H04W 24/08* (2013.01); *H04W 36/1446* (2023.05); *H04W 84/12* (2013.01)

(58) Field of Classification Search
CPC . H04W 76/19; H04W 24/08; H04W 36/1446; H04W 84/12
See application file for complete search history.

(56) References Cited

U.S. PATENT DOCUMENTS

| | | | | |
|---|---|---|---|---|
| 10,708,978 | B2 * | 7/2020 | Le ........................... | H04L 12/64 |
| 2015/0365381 | A1 * | 12/2015 | Durbin ................ | H04L 63/0272 |
| | | | | 726/15 |
| 2016/0029189 | A1 * | 1/2016 | Michael .................. | H04W 4/16 |
| | | | | 455/417 |
| 2020/0008120 | A1 * | 1/2020 | Beck ..................... | H04W 76/15 |
| 2020/0404540 | A1 * | 12/2020 | Kerpez ............. | H04W 28/0268 |
| 2021/0392548 | A1 * | 12/2021 | Mallikarjunan .. | H04W 28/0257 |
| 2022/0417841 | A1 * | 12/2022 | Chak ................... | H04L 12/4641 |

* cited by examiner

*Primary Examiner* — Abdullahi Ahmed
(74) *Attorney, Agent, or Firm* — Kamran Emdadi

(57) ABSTRACT

One example process may include receiving data at a mobile device from a cellular data channel associated with a cellular network during a communication session comprising an IP address assigned to the mobile device for use during the communication session, determining the mobile device is within a communication range of one or more available wireless local area networks (WLANs), establishing a WLAN channel between the mobile device and a WLAN among the one or more WLANs and pausing the cellular data channel, transmitting and receiving data using the IP address over the WLAN channel as part of the communication session; monitoring a performance of the WLAN channel, identifying a failing data exchange over the WLAN channel between the mobile device and the WLAN, resuming the cellular data channel to supplement the data exchanged by the mobile device, and forwarding the data from the mobile device over the cellular data channel and the WLAN channel during the session.

18 Claims, 7 Drawing Sheets

200

INTERNET
102

VPN SERVER
216

BSC/MSC/HLR
212
(CELLULAR
NETWORK)

DATA NETWORK
SERVER
214
(DATA NETWORK)

DATA NETWORK
WIRELESS
COVERAGE AREA
232

142

DATA SERVICE
STATUS:
LIMITED DATA RATE
LIMITED DATA TIME
222

CELLULAR NETWORK
WIRELESS
COVERAGE AREA
242

250

<u>270</u>

400

PROVIDING OPTIMUM MOBILE DEVICE DATA NETWORK USAGE

TECHNICAL FIELD

This application relates to optimizing mobile device data usage over data networks (wireless local area networks), and more specifically to identifying optimal opportunities to transition mobile device usage instances from cellular networks usage to data network/WLAN usage.

BACKGROUND

Conventionally, mobile/cellular networks offer services to customers subscribing to certain large-scale parent organization carriers, such as VERIZON, T-MOBILE, ATT, etc. The mobile device market exists for certain network resellers, such as those cellular service providers that lease mobile data voice and other data to the resellers so they can brand and sell mobile devices along with monthly subscriptions to use such wireless services for voice calls, messaging, data content downloading/uploading, etc.

The alternative organizations known as mobile virtual network operators (MVNOs) are often used to create such branded wireless services by third party organizations which piggyback over the parent carrier networks to offer their own customized wireless service offerings. Generally, the packages available are tied to alternatives, such as lesser data rates, lesser overall data usage, less data map coverage zones, etc. This may be an attractive option to consumers since the costs tend to be lower as well and not all users intend to use the services as often or cannot afford the premium services associated with the parent organizations. Various companies desire to enter the wireless services market, but there is a high barrier to entry. Certain technology is required for mobile device customer management services along with other expenses and high fees to the parent carrier company. Additionally, the latest services include 5G technology and unlimited data among other evolving data services has made the competition increasingly difficult to compete against.

While MVNOs do not operate wireless networks, implementing the rest of a branded wireless offering still requires a great deal of time and other resources. MVNOs need to provide subscriber interfaces, third-party interfaces, and technology for customer management, order management, applications management, and billing management. In addition, these services must be interconnected to provide a complete solution. These costs and complexities prevent many consumer brands from entering the wireless services market and becoming MVNOs. Perhaps the largest expense is the carrier cost for cellular data services. A user may purchase a MVNO controlled mobile device, subscribe to a service, access data consuming applications somewhere outside of their homes and businesses and create costs for the MVNO every time data is consumed. Limiting data usage when outside of accessible wireless network alternatives, such as Wi-Fi hotspots, home Internet access, workplace Internet access and regional Wi-Fi services (e.g., outdoor Wi-Fi in populated areas) can save costs and encourage the users to use the mobile data services when in communication with one or more non-cellular WLAN alternative.

SUMMARY

Example embodiments of the present application include a process which may include receiving data at a mobile device from a cellular data channel associated with a cellular network during a communication session comprising an IP address assigned to the mobile device for use during the communication session, determining the mobile device is within a communication range of one or more available wireless local area networks (WLANs), establishing a WLAN channel between the mobile device and a WLAN among the one or more WLANs and pausing the cellular data channel, transmitting and receiving data using the IP address over the WLAN channel as part of the communication session, identifying a failing data exchange over the WLAN channel between the mobile device and the WLAN, resuming the cellular data channel to supplement the data exchanged by the mobile device, and forwarding the data from the mobile device over the cellular data channel and the WLAN channel during the session.

Another example embodiment may include a mobile device that includes a receiver configured to receive data comprising an IP address assigned to the mobile device for use during a communication session, from a cellular data channel associated with a cellular network during the communication session, and a processor configured to determine the mobile device is within a communication range of one or more available wireless local area networks (WLANs), establish a WLAN channel between the mobile device and a WLAN among the one or more WLANs and pausing the cellular data channel, transmit and receive data using the IP address over the WLAN channel as part of the communication session, identify a failing data exchange over the WLAN channel between the mobile device and the WLAN, resume the cellular data channel to supplement the data exchanged by the mobile device, and forward the data from the mobile device over the cellular data channel and the WLAN channel during the communication session.

Example embodiments of the present application include a non-transitory computer readable storage medium configured to store instructions that when executed cause a processor to perform receiving data at a mobile device from a cellular data channel associated with a cellular network during a communication session comprising an IP address assigned to the mobile device for use during the communication session, determining the mobile device is within a communication range of one or more available wireless local area networks (WLANs), establishing a WLAN channel between the mobile device and a WLAN among the one or more WLANs and pausing the cellular data channel, transmitting and receiving data using the IP address over the WLAN channel as part of the communication session, identifying a failing data exchange over the WLAN channel between the mobile device and the WLAN, resuming the cellular data channel to supplement the data exchanged by the mobile device, and forwarding the data from the mobile device over the cellular data channel and the WLAN channel during the session.

DETAILED DESCRIPTION

Figure 1:
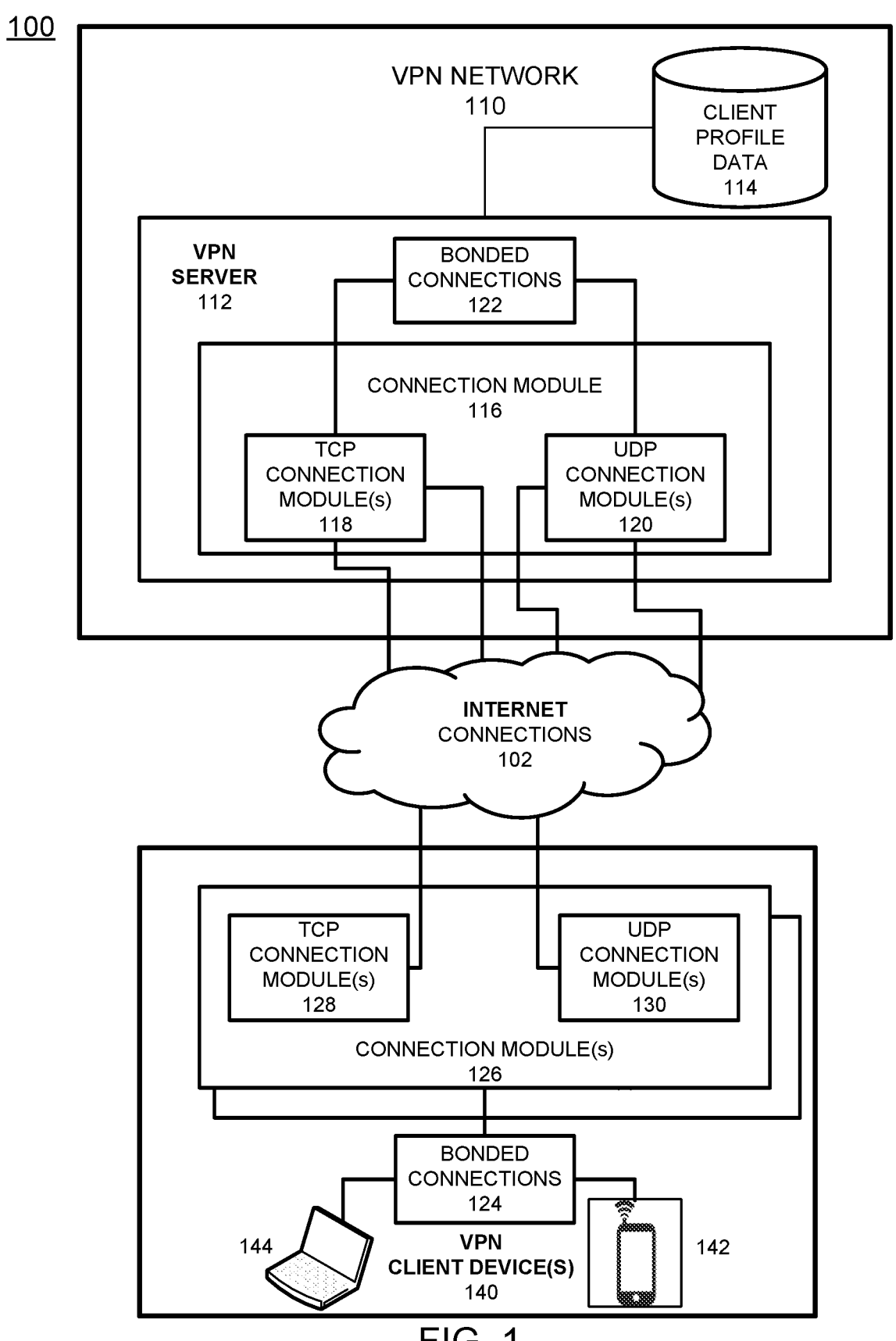
FIG. 1 illustrates an example data session network configuration according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments may be referred to with reference to a communication 'session'. The term session may be a communication data link between a client and server or any two or more network-based entities in communication across a data communication network. A session may be based on a single communication link or channel or multiple links or channels. Examples of multiple channels being used in a session may be based on multiple network interface devices (i.e., network interface cards (NICs)) being used in a single session, multiple TCP/UDP sockets being created in a single session among other device resources. Multiple transport connections which are established via TCP and/or UDP may also be considered a session. Additionally, encryption that is used for the session may be independently established to include a unique key for each transport connection and/or channel established for the session. The session encryption may instead by a single key encryption used to encrypt all the communication exchanges during the session. In general, most transport connections are encrypted independently. All of the described examples of a session may be adapted to include one or more alternatives or combinations thereof. Each session may be subjected to multiple different communication mediums providing a variety of one or more channels, transports, radio links, physical links, network interface cards and wireless and/or wired connections.

The network connection optimization for an application server providing data network access through communication channels to one or more client devices. Data communication protocols may include one or more of a transmission control protocol (TCP) and/or a user datagram protocol (UDP). Also, the TCP/IP protocol suite enables the determination of how a specific device should be connected to the Internet and how data can be exchanged by enabling a virtual network when multiple network devices are connected. TCP/IP stands for transmission control protocol/Internet protocol and it is specifically designed as a model to offer reliable data byte streams over various interconnected data networks/WLANs. UDP is a datagram/packet oriented protocol used for broadcast and multicast types of network transmissions.

TCP is a connection-oriented protocol and UDP is a connectionless protocol. The speeds associated with TCP are generally slower than UDP, while the speed of UDP are generally faster within the network with regard to sending data across a network. TCP uses a 'handshake' protocol such as 'SYN', 'SYN-ACK', 'ACK', etc., while UDP uses no handshake protocols. TCP performs error checking and error recovery, and UDP performs error checking, but discards erroneous packets. TCP employs acknowledgment segments, but UDP does not have any acknowledgment segment.

A TCP connection is established with a three-way handshake, which is a process of initiating and acknowledging a connection. Once the connection is established, data transfer begins and when the transmission process is finished the connection is terminated by the closing of an established virtual circuit. UDP uses a simple transmission approach without implied hand-shaking requirements for ordering, reliability, or data integrity. UDP also does not perform the same error checking and correction efforts to avoid the overhead of such processing efforts at the network interface level, and is also compatible with packet broadcasts and multicasting.

TCP reads data as streams of bytes, and the message is transmitted to segment boundaries. UDP messages contain packets that were sent one by one. It also checks for integrity at the arrival time. TCP messages move across the Internet from one computer to another. It is not connection-based, so one program can send lots of packets to another. TCP rearranges data packets in a specific order. UDP protocol has no fixed order because all the packets are independent of each other. The speed for TCP is slower and UDP is faster since error recovery is omitted from UDP. The header sizes are 20 bytes and 8 bytes for TCP and UDP, respectively.

In general, TCP requires three packets to set up a socket connection before any user data can be sent. UDP does not require three packets for socket setup. TCP performs error checking and also error recovery and UDP performs error checking, but discards erroneous packets. TCP is reliable as it guarantees delivery of data to the destination router. The delivery of data to the destination is not guaranteed by UDP. UDP is ideal to use with multimedia like voice over IP (VoIP) since minimizing delays is critical. TCP sockets should be used when both the client and the server independently send packets and an occasional delay is acceptable. UDP should be used if both the client and the server separately send packets, and an occasional delay is not acceptable.

FIG. 1 illustrates an example data session network configuration according to example embodiments. Referring to FIG. 1, the configuration 100 may include a virtual private network (VPN) 110 which includes one or more VPN servers 112 and data storage, which in this case is used for storing client profile data 114 associated with one or more new or old client communication sessions. The communication sessions may include multiple network channels, generally, UDP and TCP are used for such sessions, however, other protocols used across the Internet 102 may also be used, such as HTTPS. The channels may be bonded together to create a single virtual channel for communication as shown from the bonded connections module 122 for the VPN server 112 and the bonded connections module 124 of the client device 140. In general, the VPN 112 may include UDP module(s) 120 and a TCP module(s) 118 as part of a connection module 116 to manage the connection process and a bonded connections module 122 to manage the various channels and the bonding of information among the channels.

The client side may include one or more client devices 140 such as a smartphone 142, cell phone, tablet, laptop 144, etc. Any one of those individual devices may be the 'client device' 140 at any particular time for a particular session. The client side may have an installed agent software application that communicates with the cloud servers of the VPN network 110. The communications are established and maintained across the Internet 102. The client side may also have its own bonded connections module 124 which manages one or more TCP/UDP connections associated with TCP/UDP connection modules 128/130, each of which may have multiple modules to accommodate multiple session, as part of the connection module(s) 126 of the client side. The module 126 may be multiple modules which are used for multiple respective sessions with various end user devices 140.

In general, a transport connection is a connection between the VPN client and the VPN server over a particular network and/or Internet connection using a particular protocol, such as TCP, UDP, HTTPS, or another protocol. The established connection is used to send encapsulated and/or encrypted application packets between the client and the server. In one example embodiment, multiple transports connections are created for each session over the available networks and protocols. Conventionally, a VPN will create one transport connection over one network with one protocol per session. For example, given two networks to utilize, the data connection optimization application may create three transport connections (e.g., TCP, UDP, and HTTPS) over each network, for a total of six transport connections. Other combinations of connection types, numbers of connections, etc., may also be utilized.

Figure 2A:
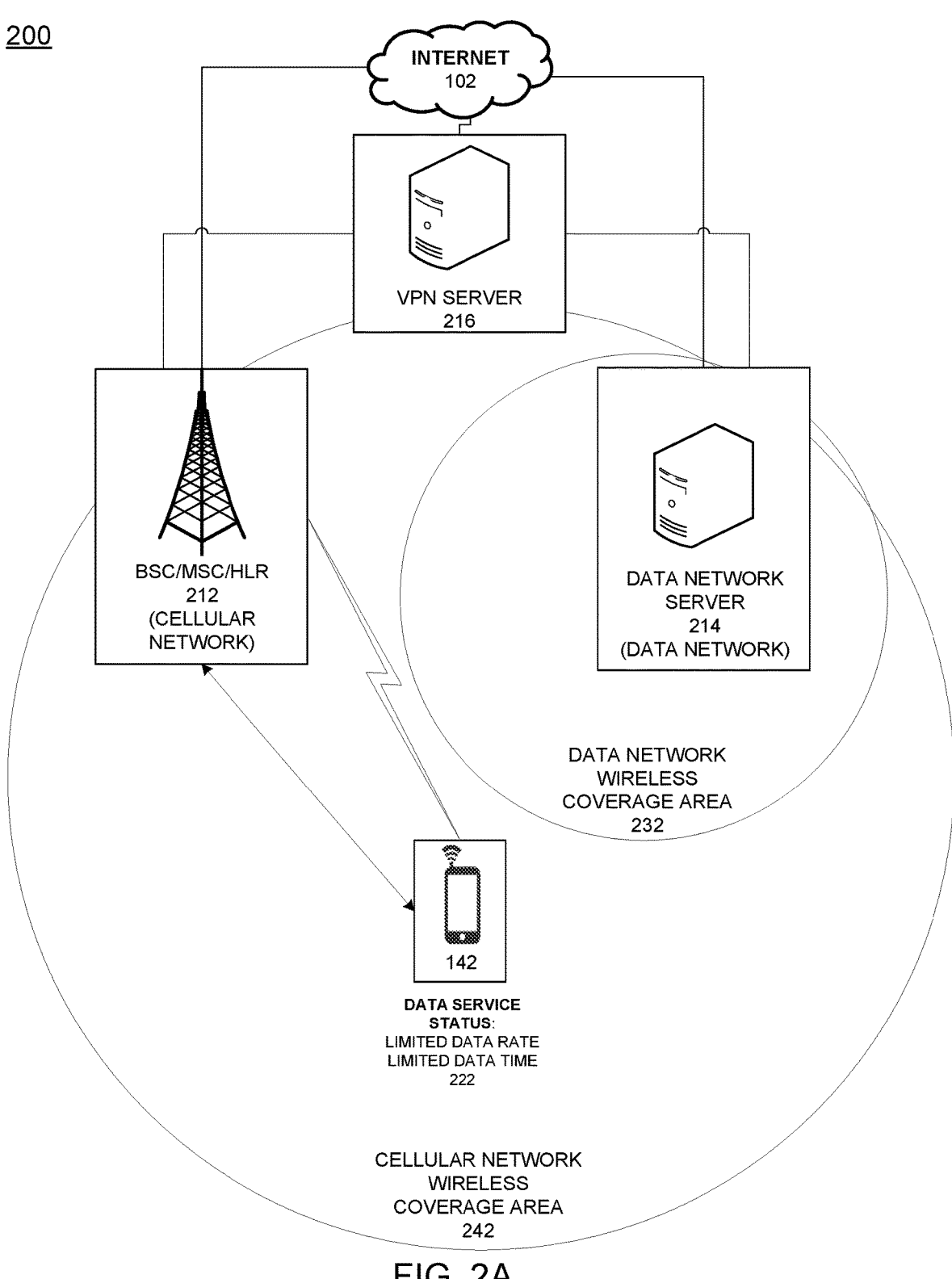
FIG. 2A illustrates an example network configuration of a mobile device being outside a coverage area of a WLAN and inside a coverage area of a cellular network according to example embodiments.

FIG. 2A illustrates an example network configuration of a mobile device being outside a coverage area of a data network (WLAN) and inside a coverage area of a cellular network according to example embodiments. Referring to FIG. 2A, the configuration 200 includes a cellular network 212 with any base stations, base controller stations (BSCs) mobile switching centers (MSCs) and home location resource (HLR) entities. The cellular signal is likely to be widely available via a large coverage area 242 to a mobile device 142, however, the data rate and time and/or total data used 222 may be limited by an application operating on the mobile device. The management application may be controlled by the MVNO service provider to set those cellular data usage limits and restrictions. The application may also have a connection manager that identifies potential Wi-Fi networks (wireless local area networks WLANs) which can be used instead of cellular data after one or more data usage limits/thresholds are reached. The wireless connections may include one or more data sessions which are used to connect to the Internet 102 via a cellular session and/or any available WLAN (i.e., Wi-Fi sessions). In this example, the mobile device 142 is not within the coverage area of the data network 232 managed by a data network access point and/or server 214. When the mobile device 142 moves to a new location and becomes within communication range of the data network (WLAN) 232, the connection manager may suspend cellular data usage or limit the usage data rate until the Wi-Fi communication becomes available or is identified in a new data session. The data channels between the cellular and the Wi-Fi network may be combined into a channel bonded communication commonly used by the mobile device 142 at the same time. The terms 'Wi-Fi network' and 'WLAN network' are used interchangeably and may be the same network. Also, the VPN 216 may be the connection manager and/or connection point for the mobile device 142 while it is communicating with the various communication networks.

Figure 2B:
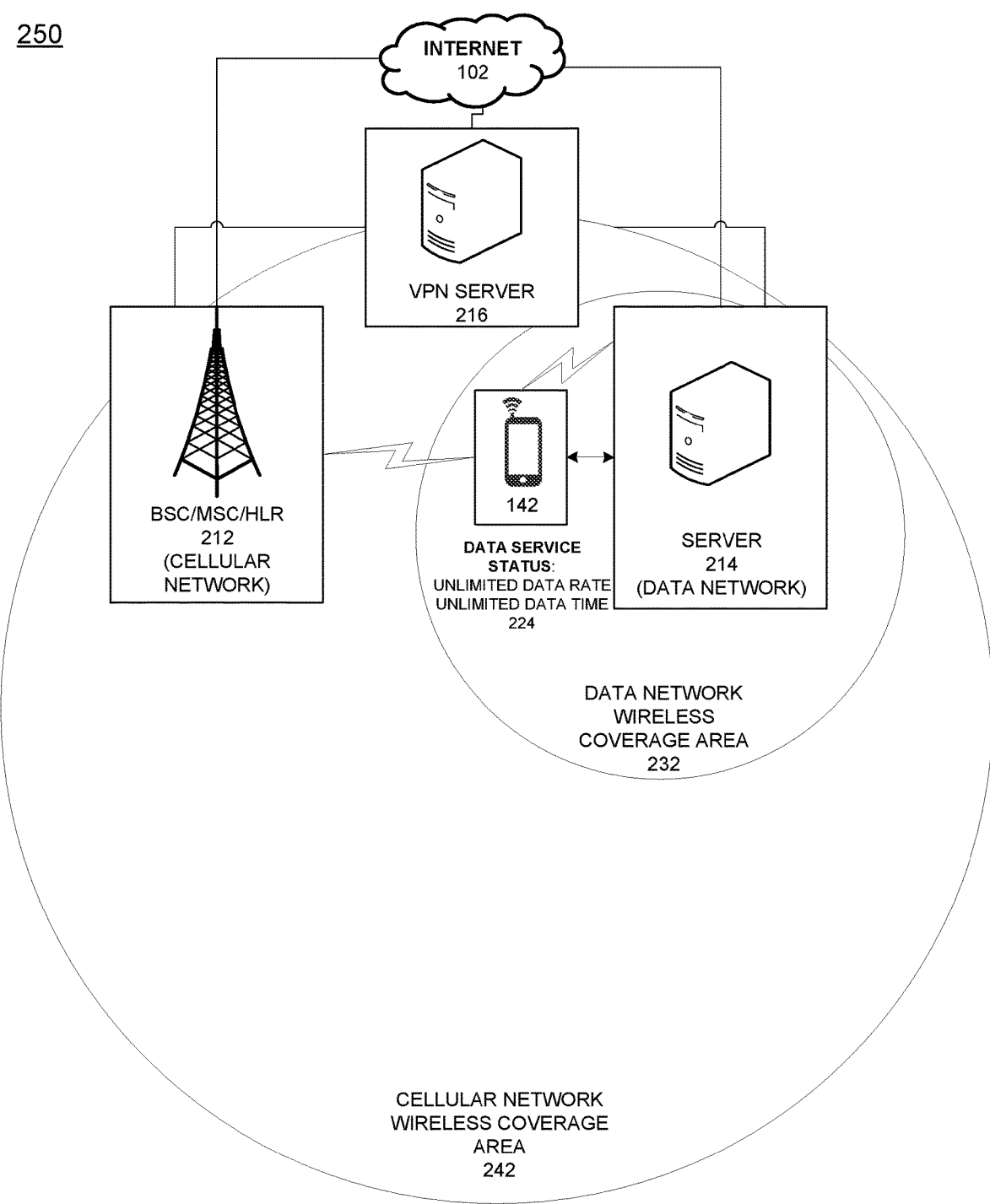
FIG. 2B illustrates an example network configuration of a mobile device being inside a coverage area of a WLAN and a cellular network according to example embodiments.

FIG. 2B illustrates an example network configuration of a mobile device being inside a coverage area of a data network/WLAN and a cellular network according to example embodiments. Referring to FIG. 2B, the example configuration 250 includes a scenario where the mobile device 142 is now in communication range of the WLAN 232. The application connection manager operating on the mobile device 142 may change its data management instructions 224 to provide unlimited data usage for the Wi-Fi network and attempt to stop using the cellular data network while on the Wi-Fi network. Once a period of time has lapsed and the data rate is optimal on the Wi-Fi network 232, the cellular data communication may remain as a bonded channel that remains active but is only implemented/used when a period of data loss is experienced by the mobile device 142, such as a delay in the Wi-Fi network which is identified by the mobile device 142.

Figure 2C:
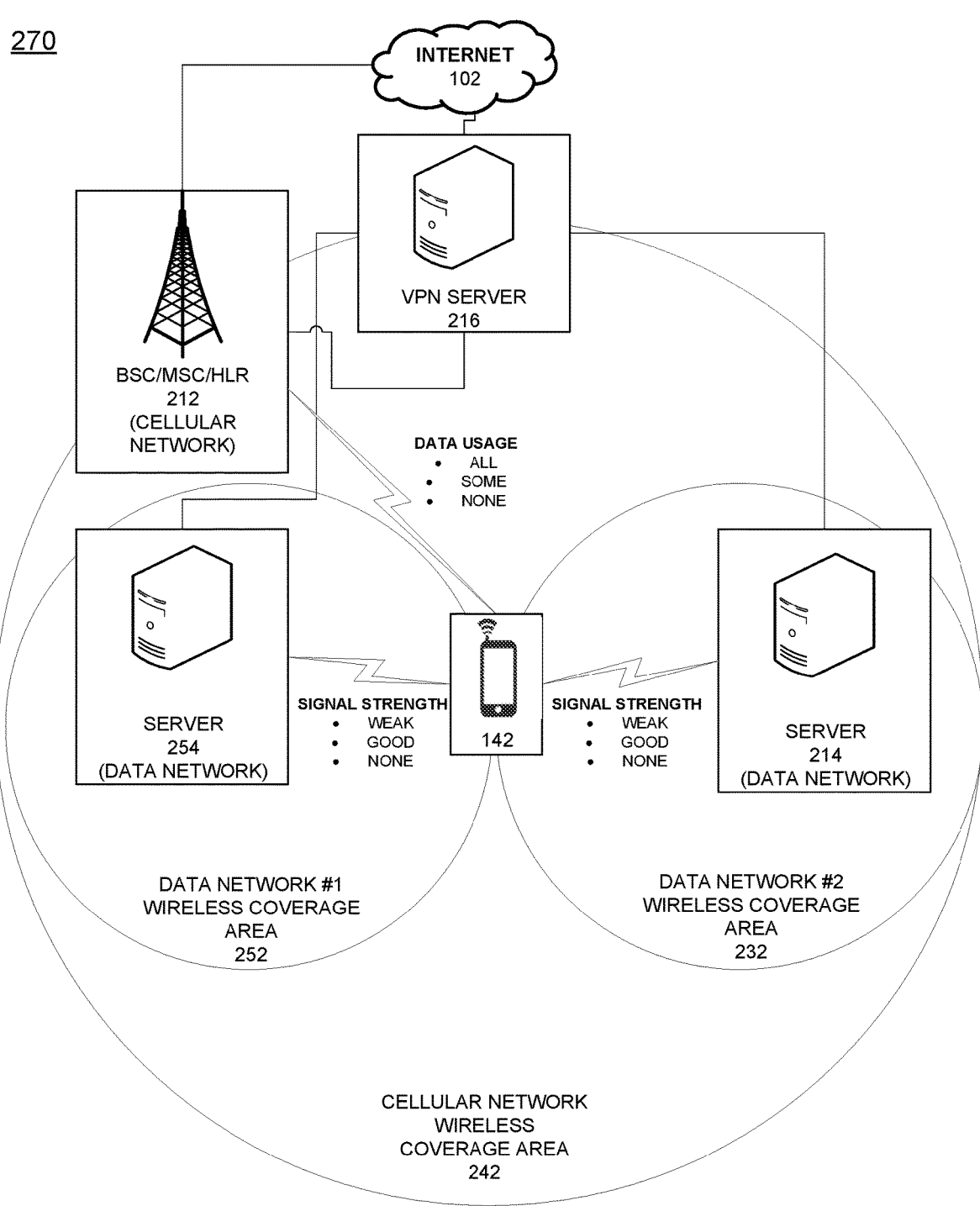
FIG. 2C illustrates an example system diagram of a mobile device being inside a coverage area of multiple WLANs and a cellular network according to example embodiments.

FIG. 2C illustrates an example system diagram of a mobile device being inside a coverage area of a WLAN and a cellular network according to example embodiments. Referring to FIG. 2C, the network configuration 270 demonstrates an example where a mobile device may be on the edge of a Wi-Fi network or multiple Wi-Fi networks 232/252. In this scenario, the cellular data network may be accessible by the mobile device 142. The multiple Wi-Fi networks may be somewhat available to the mobile device 142 but may be offering less than ideal signal strength, data rates and/or limited data connectivity. In this case, the Wi-Fi network #1 252 including data network server 254 may provide a good, weak or no data signal, while the other Wi-Fi network #2 232 including data network server 214 provides a good, weak or no data signal. The cellular data provided to the mobile device 142 may permit all cellular data, some cellular data or no cellular data. The result is various combinations of possibilities for data usage between the three or more networks and the mobile device 142.

According to example embodiments, if the mobile device 142 is on the edge of a coverage area of a Wi-Fi network (see FIG. 2C) and the signal performance and data exchange characteristics are performing poorly, there may be two options for the mobile device. One option is to stay on that Wi-Fi network and continue experiencing the poor Wi-Fi performance with the hope of a better result in the future. This option could provide a bad user experience when operating the mobile device. Or, the other option may include the mobile device disregarding that Wi-Fi network, either from a decision by the device 142 based on signal strength or some other measured metric being identified and used as the basis to leave the network. Also, the user could always manually shut-off/disconnect from that Wi-Fi network, which would then cause the mobile device to use more cellular data since the only active Wi-Fi network has been removed.

The MVNOs which provide service to the device 142 may desire to avoid the Wi-Fi being ignored or turned-off since any option that utilizes more cellular data usage will increase their overall operating costs. Specifically, if the user turned-off the Wi-Fi manually and forgot to turn it back on later, they could continue using cellular data even when there is a new Wi-Fi network available to use with optimal signal strength and data services.

One approach is to make use of both potential connections. The mobile device can maintain a poor Wi-Fi network connection and use as much of that data service as possible, and supplement the data from the Wi-Fi with a certain amount of cellular data usage to improve the user experience so they become frustrated and leave the Wi-Fi network altogether. Since MVNO service providers want to limit the cellular data usage, there can potentially be limits imposed on how much cellular data is used based on data usage threshold limits and/or data usage time limits and/or bandwidths usage limits (i.e., use up to 'X' Mbps of cellular bandwidth to compensate the Wi-Fi, for a period of time 'Y', etc.).

In the example of transitioning between Wi-Fi networks, in a general use case, when the mobile device switches networks, there is a hard switch between two different networks, which changes the public IP address and causes applications to be interrupted and need to re-establish their individual connections. Some applications handle this hard switch better than others, however, if the device was in the middle of downloading a file and the networks switched, the download would stop and would need to start over again on the new network at the very beginning. There can also be a gap when switching between networks, sometimes a fraction of a second, sometimes multiple seconds, which can interrupt applications as well, particularly something real-time like an audio or video call.

According to example embodiment, in the example of a smart network management application, since traffic is being forwarded through a management server, traffic to the Internet maintains a consistent public IP address, even as the device changes between networks and this reduces the impact of those network switch-over operations. The fewer interruptions, then the less amount of overall data that is consumed. In a scenario of leveraging multiple data service networks, when switching between two Wi-Fi networks, if a small amount of cellular data is available to fill in the gap needed as the mobile device transitions between the two or more Wi-Fi networks, the disruption can be minimal and ideally undetectable by the user. Therefore, including the use of cellular data at short and sporadic key times may optimize the overall user experience in order when using various Wi-Fi networks. As a result, the optimization of cellular data usage as it pertains to multiple Wi-Fi networks will use less cellular data overall.

Figure 3A:
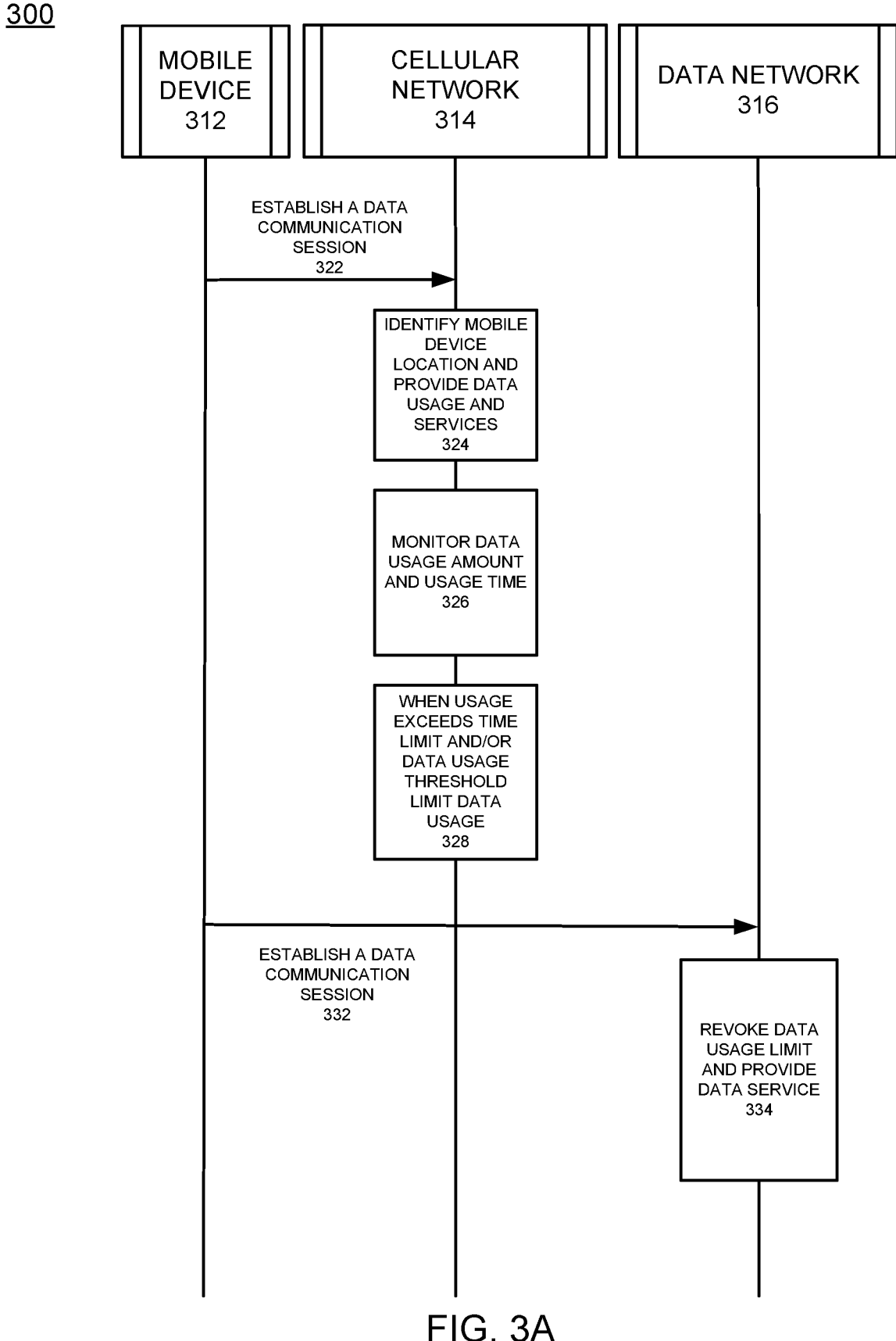
FIG. 3A illustrates a system signaling diagram of communication between a mobile device and a cellular data network and a wireless WLAN according to example embodiments.

FIG. 3A illustrates a system signaling diagram of communication between a mobile device and a cellular data network and a wireless data network/WLAN according to example embodiments. Referring to FIG. 3A, the example 300 includes the mobile device 312 establishing a data communication session 322 with a cellular data network 314 prior to connecting with any Wi-Fi networks. The cellular data network may have a connection controller server process which operates with a connection controller agent process operating in the mobile device 312. The connection controller or connection manager may identify the mobile device location, data usage metrics 324, including time of data use, data rate, total data consumed, etc. The process may be an ongoing monitoring procedure 326 to determine a total amount of data consumed and periods of potential network access to other networks. Thresholds may be set to limit the amount of cellular data used at a particular location, for a particular period of time, etc., and when one or more of those thresholds are exceeded the data usage may be limited or prevented 328. At a later time the mobile device 312 may establish a data connection 332 with a data network (Wi-Fi) 316 and any restrictions on data usage or cellular data usage may be removed 334 provided the WLAN 316 is providing the device 312 with a reliable data service. The cellular network connection may be maintained while the WLAN 316 is being used.

Figure 3B:
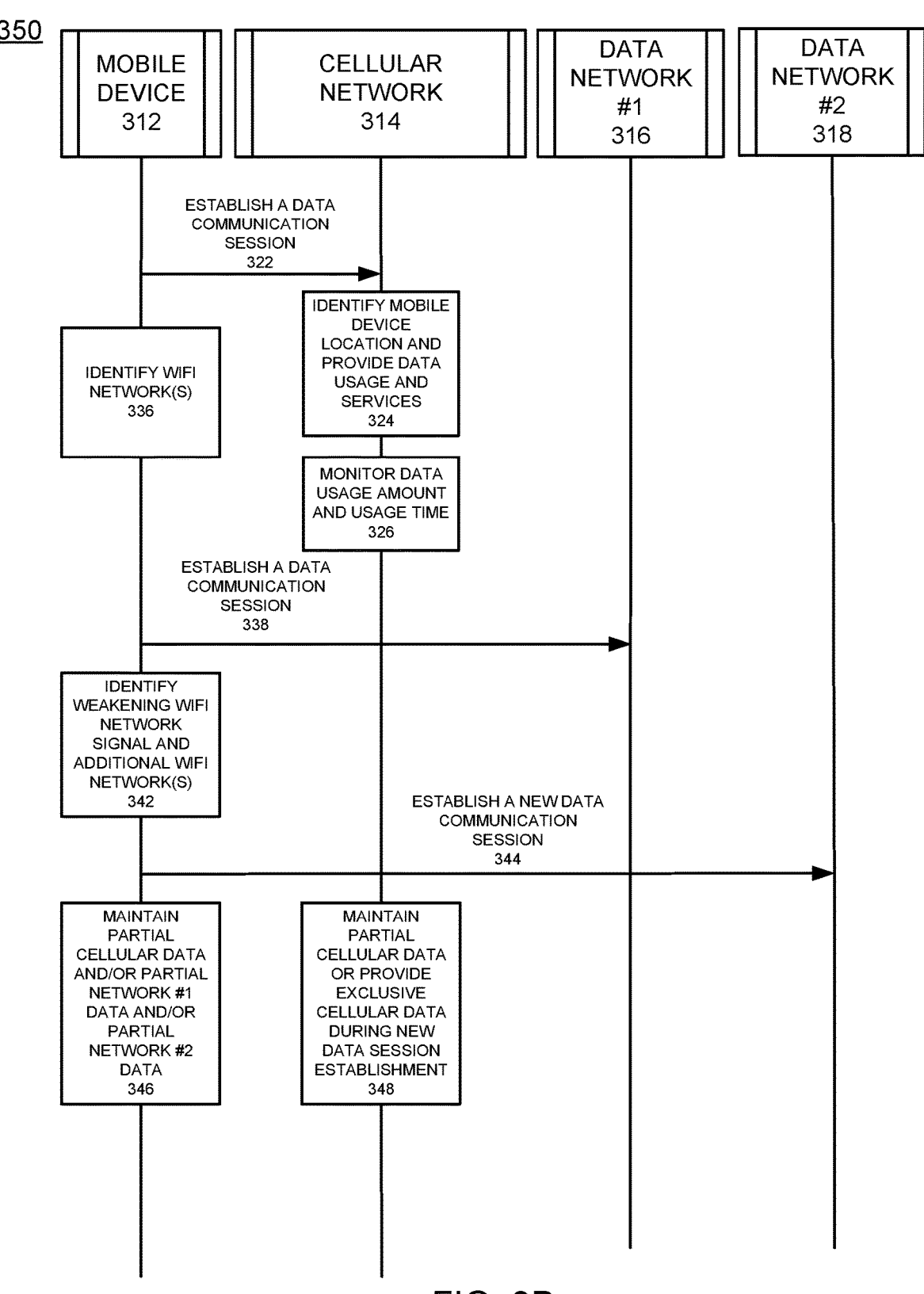
FIG. 3B illustrates a system signaling diagram of communication between a mobile device and a cellular data network and multiple wireless WLANs according to example embodiments.

FIG. 3B illustrates a system signaling diagram of communication between a mobile device and a cellular data network and multiple WLANs according to example embodiments. Referring to FIG. 3B, the example 350 provides the mobile device performing an operation of identifying potential Wi-Fi networks 336 while being actively connected to a cellular data network. The example provides identifying and connecting 338 to a first Wi-Fi network 316 and then identifying that the Wi-Fi signal is weak 342 and attempting to identify additional Wi-Fi networks, such as network #2 318. The connection may be established 344 with the new network 318, however, in this case, the connection to the previous Wi-Fi network 316 may also be maintained 346/348 (as partial or supplemental connections) along with a connection to the cellular network 314. There may be three channels which are active and managed by a VPN server which maintains a single IP address for the mobile device while balancing the load of data transfers among the multiple Wi-Fi networks and/or the cellular network. The priority for using the cellular data network may be less than the priority for using the Wi-Fi networks to discourage cellular data usage. The partial data usage of all three networks may be maintained 346, or in the case of establishing a connection, the cellular data network may be used when attempting to connect to a new network connection 348.

One example method of operation may include receiving data at a mobile device from a cellular data channel associated with a cellular network during a communication session comprising an IP address assigned to the mobile device for use during the communication session, determining the mobile device is within a communication range of one or more available wireless local area networks (WLANs), establishing a WLAN channel between the mobile device and a WLAN among the one or more WLANs and pausing the cellular data channel, transmitting and receiving data using the IP address over the WLAN channel as part of the communication session, monitoring a performance of the WLAN channel, identifying a failing data exchange over the WLAN channel between the mobile device and the WLAN, resuming the cellular data channel to supplement the data exchanged by the mobile device, and forwarding the data from the mobile device over the cellular data channel and the WLAN channel during the session.

The initiating the cellular data channel to supplement the data exchanged by the mobile device may include creating a bonded channel managed by a virtual private network (VPN) that distributes data exchanged to and from the mobile device using the IP address over both the WLAN channel and the cellular data channel. The process may include forwarding and receiving additional data exclusively over the WLAN channel, determining a data metric of the WLAN channel is below a threshold data metric value, and forwarding and receiving subsequent data over the cellular data channel and the WLAN channel. The data metric value includes one or more of a time period required to exchange data, a data rate value, a jitter value, a data latency value, a packet loss value. The method may also include initiating a timer while forwarding the subsequent data over the cellular data channel, and attempting to forward and receive additional data over the WLAN channel after the timer has reached a time limit. Responsive to identifying the failing data exchange over the WLAN channel between the mobile device and the WLAN, the process may include identifying a new WLAN as an available connection, and attempting to connect to the new WLAN to establish a new WLAN channel.

The process may also include resuming the cellular channel during a transition period from the failing WLAN channel to the new WLAN channel, and pausing the cellular channel responsive to the new WLAN channel being initiated. The process may also include limiting an amount of data exchanged over the cellular data channel by attempting to connect to the WLAN channel when a data transmission threshold of data exchanged over the cellular channel has been reached. The monitoring the performance of the WLAN channel includes identifying the one or more data metric values is above the threshold data metric value and resuming the WLAN channel and pausing the cellular channel.

A combination of one or more modified calculations may also be performed, which includes one or more of the metrics/parameters with one or more corresponding thresholds identifying the acceptable and unacceptable ranges of data network activity. Also, a conditional requirement may be used, where a first metric exceeding or falling below an established threshold may trigger an additional metric calculation to be performed. Additionally, the probability of one or more metrics failing a requirement test or other established criteria may be imposed as part of the logic used to make a determination as to whether a data channel is sufficient or requires additional data support from another bonded channel.

In another example, the amount of data exchanged over the cellular data channel is limited to less than full speed, and wherein the data metric value of the combined data exchanged operates above the threshold data metric value. After determining the cellular channel is necessary to supplement the data exchanged over the WLAN in order to maintain a quality of service, the amount of data transfers both in quantity and in the amount of data exchanged may be limited such that the cellular channel is used less than it was used previously during the current data session and/or data exchange. The threshold data metric value may be maintained by using the cellular data channel with the WLAN channel, however, the amount of data sent and/or received over the cellular channel may be limited to reduce cellular usage and to favor the WLAN as the first priority network for data exchange. The criteria for limiting cellular data exchanged may include a priority data routing scheme such as cheapest path first routing procedure, priority being established for the WLAN channel, a data rate maximum (i.e., 5 Mbps) being imposed on the cellular channel, and/or intermittent pausing of the cellular channel.

In another example, the method may include identifying a list of trusted WLANs from memory, and disconnecting the VPN when the mobile device is connected to one or more of the trusted WLANs. In one example, when the mobile device is operating on a trusted/known WLAN, cellular data usage may be paused and the VPN may be temporarily removed as the data route where the data is exchanged to/from between the mobile device and the destination locations. The VPN may be re-established as the source of data communication management when the WLAN is disconnected and/or the current WLAN is not part of the trusted list of VPNs.

Also, responsive to detecting there is no active trusted WLAN connection, the mobile device may attempt to connect to the VPN. When a trusted WLAN connection is not identified as being connected to the mobile device for data exchange purposes, the VPN will be connected or re-connected if a previous connection was paused.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 4:
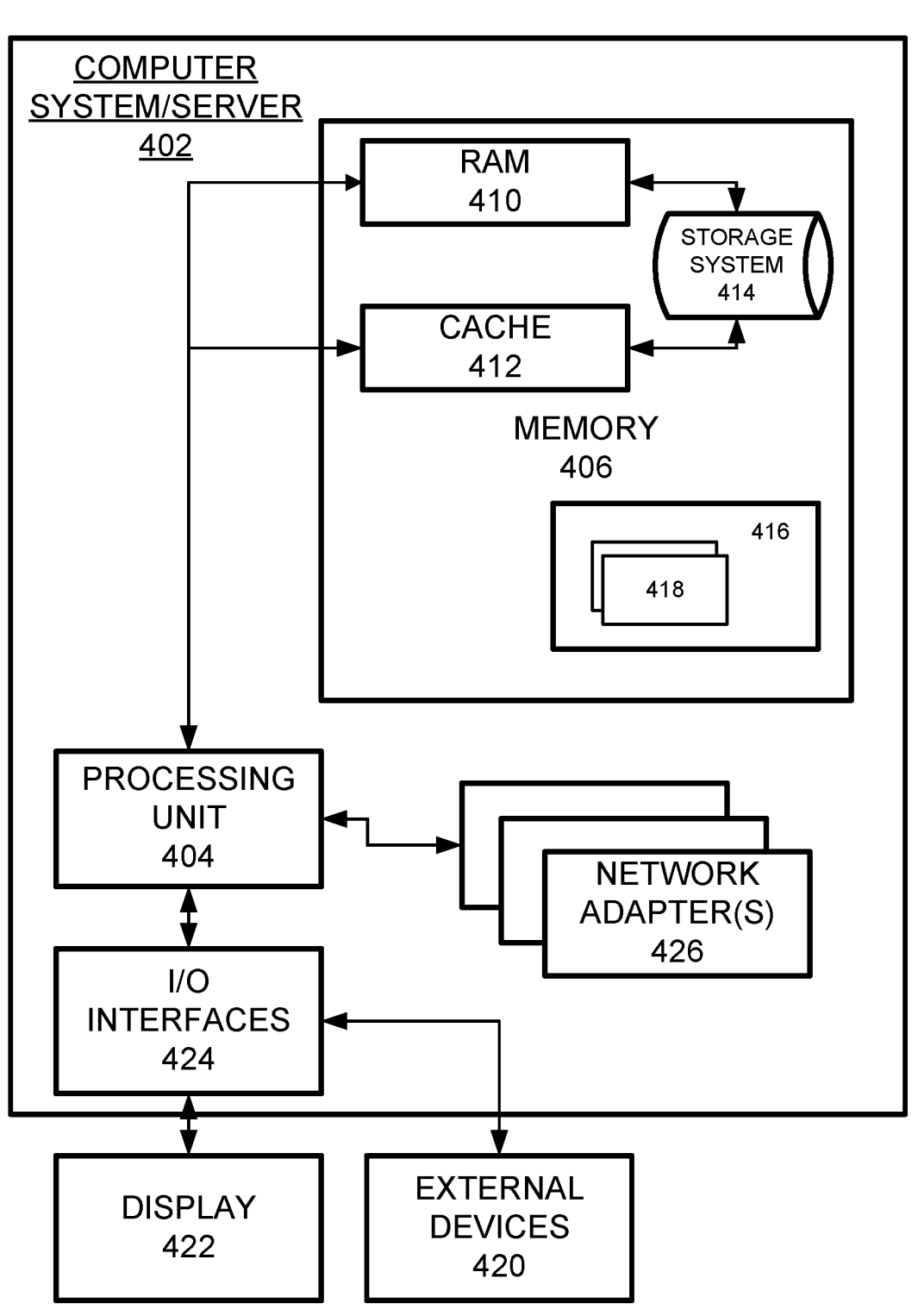
FIG. 4 illustrates an example network entity device configured to store instructions, software, and corresponding hardware for executing the same according to example embodiments.

FIG. 4 illustrates an example network entity device configured to store instructions, software, and corresponding hardware for executing the same according to example embodiments. FIG. 4 is not intended to suggest any limitation as to the scope of use or functionality of embodiments of the application described herein. Regardless, the computing node 400 is capable of being implemented and/or performing any of the functionality set forth hereinabove.

In computing node 400 there is a computer system/server 402, which is operational with numerous other general purpose or special purpose computing system environments or configurations. Examples of well-known computing systems, environments, and/or configurations that may be suitable for use with computer system/server 402 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 4, computer system/server 402 in cloud computing node 400 is displayed in the form of a general-purpose computing device. The components of computer system/server 402 may include, but are not limited to, one or more processors or processing units 404, a system memory 406, and a bus that couples various system components including system memory 406 to processor 404.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media. System memory 406, in one embodiment, implements the flow diagrams of the other figures. The system memory 406 can include computer system readable media in the form of volatile memory, such as random-access memory (RAM) 410 and/or cache memory 412. Computer system/server 402 may further include other removable/non-removable, volatile/non-volatile computer system storage media. By way of example only, storage system 414 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 406 may include at least one program product having a set (e.g., at least one) of program modules that are configured to carry out the functions of various embodiments of the application.

Program/utility 416, having a set (at least one) of program modules 418, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 402 may also communicate with one or more external devices 420 such as a keyboard, a pointing device, a display 422, etc.; one or more devices that enable a user to interact with computer system/server 402; and/or any devices (e.g., network card, modem, etc.) that enable computer system/server 402 to communicate with one or more other computing devices. Such communication can occur via I/O interfaces 424. Still yet, computer system/server 402 can communicate with one or more networks such as a local area network (LAN), a general wide area network (WAN), and/or a public network (e.g., the Internet) via network adapter(s) 426. As depicted, network adapter(s) 426 communicates with the other components of computer system/server 402 via a bus. It should be understood that although not displayed, other hardware and/or software components could be used in conjunction with computer system/server 402. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising
  receiving data at a mobile device from a cellular data channel associated with a cellular network during a communication session;
  determining the mobile device is within a communication range of one or more available wireless local area networks (WLANs);
  establishing a WLAN channel between the mobile device and a WLAN among the one or more WLANs and bonding the WLAN channel with the cellular data channel to use the WLAN channel and the cellular data channel at a same time for data transfers to and from the mobile device;
  imposing a restriction which limits an amount of cellular data used by the cellular data channel for a period of time, and maintaining the cellular data channel and the WLAN channel as bonded channels during the restriction;
  identifying a failing data exchange over the WLAN channel between the mobile device and the WLAN, wherein the failed data exchange comprises a data metric value of the WLAN operating below a threshold data metric value;
  after the period of time has lapsed, removing the restriction and resuming use of the cellular data channel to supplement the data exchanged by the mobile device when the failed data exchange is identified as a period of data loss caused by the WLAN, wherein the amount of data exchanged over the cellular data channel is limited to less than a full speed capable by the cellular data channel, and wherein a data metric value of the combined data exchanged over the WLAN and cellular channel is operating above the threshold data metric value; and transmitting and receiving the data from the mobile device over the cellular data channel and the WLAN channel as the bonded channels during the communication session.

2. The method of claim 1, wherein the resuming the cellular data channel to supplement the data exchanged by the mobile device comprises creating the bonded channel managed by a virtual private network (VPN) that distributes data exchanged to and from the mobile device using the IP address over both the WLAN channel and the cellular data channel.

3. The method of claim 1, comprising
  forwarding and receiving additional data exclusively over the WLAN channel;
  determining a data metric of the WLAN channel is below the threshold data metric value; and
  forwarding and receiving subsequent data over the cellular data channel and the WLAN channel.

4. The method of claim 3, wherein the data metric value comprises one or more of a time period required to exchange data, a data rate value, a jitter value, a data latency value, a packet loss value.

5. The method of claim 3, comprising
  responsive to identifying the failing data exchange over the WLAN channel between the mobile device and the WLAN, identifying a new WLAN as an available connection; and
  attempting to connect to the new WLAN to establish a new WLAN channel.

6. The method of claim 5, comprising
  resuming the cellular channel during a transition period from the failing WLAN channel to the new WLAN channel; and
  pausing the cellular channel responsive to the new WLAN channel being initiated and when the WLAN channel is confirmed to provide an improved metric value above the threshold data metric value.

7. The method of claim 3, comprising
  monitoring the performance of the WLAN channel by identifying the one or more data metric values is above the threshold data metric value; and
  resuming the WLAN channel and pausing the cellular channel.

8. The method of claim 2, comprising
  identifying a list of trusted WLANs from memory, and disconnecting the VPN when the mobile device is connected to one or more of the trusted WLANs.

9. The method of claim 8, comprising
  establishing a connection with the VPN responsive to detecting there is no active trusted WLAN connection.

10. A mobile device comprising
  a receiver configured to receive data from a cellular data channel associated with a cellular network during a communication session; and
  a processor configured to
  determine the mobile device is within a communication range of one or more available wireless local area networks (WLANs);
  establish a WLAN channel between the mobile device and a WLAN among the one or more WLANs and bond the WLAN channel with the cellular data channel to use the WLAN channel and the cellular data channel at the same time for data transfers to and from the mobile device;
  impose a restriction which limits an amount of cellular data used by the cellular data channel for a period of time, and maintain the cellular data channel and the WLAN channel as bonded channels during the restriction;

identify a failing data exchange over the WLAN channel between the mobile device and the WLAN, wherein the failed data exchange comprises a data metric value of the WLAN operating below a threshold data metric value;

after the period of time has lapsed, remove the restriction and resume use of the cellular data channel to supplement the data exchanged by the mobile device when the failed data exchange is identified as a period of data loss caused by the WLAN, wherein the amount of data exchanged over the cellular data channel is limited to less than a full speed capable by the cellular data channel, and wherein a data metric value of the combined data exchanged over the WLAN and cellular channel is operating above the threshold data metric value; and transmit and receive the data from the mobile device over the cellular data channel and the WLAN channel as the bonded channels during the communication session.

11. The mobile device of claim 10, wherein the processor resumes the cellular data channel to supplement the data exchanged by the mobile device by creating the bonded channel managed by a virtual private network (VPN) that distributes data exchanged to and from the mobile device using the IP address over both the WLAN channel and the cellular data channel.

12. The mobile device of claim 10, wherein the processor is further configured to forward and receive additional data exclusively over the WLAN channel;

determine a data metric of the WLAN channel is below the threshold data metric value; and forward and receive subsequent data over the cellular data channel and the WLAN channel.

13. The mobile device of claim 12, wherein the data metric value comprises one or more of a time period required to exchange data, a data rate value, a jitter value, a data latency value, a packet loss value.

14. The mobile device of claim 12, wherein the processor is further configured to responsive to identifying the failing data exchange over the WLAN channel between the mobile device and the WLAN, identify a new WLAN as an available connection; and attempt to connect to the new WLAN to establish a new WLAN channel.

15. The mobile device of claim 14, wherein the processor is further configured to resume the cellular channel during a transition period from the failing WLAN channel to the new WLAN channel; and pause the cellular channel responsive to the new WLAN channel being initiated and when the WLAN channel is confirmed to provide an improved metric value above the threshold data metric value.

16. The mobile device of claim 12, wherein the processor is further configured to monitor the performance of the WLAN channel by identifying the one or more data metric values is above the threshold data metric value; and resume the WLAN channel and pausing the cellular channel.

17. The mobile device of claim 11, wherein the processor is further configured to identifying a list of trusted WLANs from memory, and disconnecting the VPN when the mobile device is connected to one or more of the trusted WLANs; and establishing a connection with the VPN responsive to detecting there is no active trusted WLAN connection.

18. A non-transitory computer readable storage medium comprising instructions that when executed cause a processor to perform:

receiving data at a mobile device from a cellular data channel associated with a cellular network during a communication session;

determining the mobile device is within a communication range of one or more available wireless local area networks (WLANs);

establishing a WLAN channel between the mobile device and a WLAN among the one or more WLANs and bonding the WLAN channel with the cellular data channel to use the WLAN channel and the cellular data channel at a same time for data transfers to and from the mobile device;

imposing a restriction which limits an amount of cellular data used by the cellular data channel for a period of time, and maintaining the cellular data channel and the WLAN channel as bonded channels during the restriction;

identifying a failing data exchange over the WLAN channel between the mobile device and the WLAN, wherein the failed data exchange comprises a data metric value of the WLAN operating below a threshold data metric value;

after the period of time has lapsed, removing the restriction and resuming use of the cellular data channel to supplement the data exchanged by the mobile device when the failed data exchange is identified as a period of data loss caused by the WLAN, wherein the amount of data exchanged over the cellular data channel is limited to less than a full speed capable by the cellular data channel, and wherein a data metric value of the combined data exchanged over the WLAN and cellular channel is operating above the threshold data metric value; and transmitting and receiving the data from the mobile device over the cellular data channel and the WLAN channel as the bonded channels during the communication session.

* * * * *